US009008084B2

(12) United States Patent
Zhang et al.

(10) Patent No.: US 9,008,084 B2
(45) Date of Patent: Apr. 14, 2015

(54) METHOD OF IPV6 AT DATA CENTER NETWORK WITH VM MOBILITY USING GRACEFUL ADDRESS MIGRATION

(75) Inventors: Ming Zhang, San Jose, CA (US); Chengelpet Ramesh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 318 days.

(21) Appl. No.: 13/402,306

(22) Filed: Feb. 22, 2012

(65) Prior Publication Data

US 2013/0215888 A1     Aug. 22, 2013

(51) Int. Cl.
*H04L 12/28* (2006.01)
*H04L 12/751* (2013.01)
*H04L 12/713* (2013.01)
*H04L 12/741* (2013.01)

(52) U.S. Cl.
CPC ............... *H04L 45/02* (2013.01); *H04L 45/586* (2013.01); *H04L 45/74* (2013.01)

(58) Field of Classification Search
CPC ....... H04L 45/586; H04L 67/06; H04L 41/50; H04L 45/38; H04L 45/42; H04L 61/251; H04L 49/70; H04L 63/0272; H04L 29/12358; H04L 12/4641; H04L 69/167; H04L 29/12066; H04L 41/08; H04L 41/0803
USPC ......... 370/252, 390, 400, 392, 384, 393, 396, 370/397, 395.32; 709/223, 225, 226, 238
See application file for complete search history.

(56) References Cited

U.S. PATENT DOCUMENTS

| | | | | |
|---|---|---|---|---|
| 2008/0253382 | A1* | 10/2008 | Bachmann et al. | 370/400 |
| 2010/0316005 | A1* | 12/2010 | Lee et al. | 370/329 |
| 2011/0271005 | A1* | 11/2011 | Bharrat et al. | 709/232 |
| 2012/0250569 | A1* | 10/2012 | Chanda | 370/252 |
| 2013/0086236 | A1* | 4/2013 | Baucke et al. | 709/223 |
| 2013/0227167 | A1* | 8/2013 | Prince et al. | 709/238 |

* cited by examiner

*Primary Examiner* — Awet Haile
(74) *Attorney, Agent, or Firm* — Merchant & Gould

(57) ABSTRACT

Systems and methods are provided to detect when a virtual machine moves across a switch device boundary, keep existing application sessions alive, and provide optimal forwarding for new application sessions with graceful address migration. Virtual machine movement can be detected on the new switching device by comparing the Device ID in the Source Address of the ND-NA with the Device ID of the new switching device. A temporary hardware forwarding sub-optimal path is maintained for existing application sessions. A new IP address is assigned to the moved virtual machine and an optimal forwarding path is programmed in hardware for new application sessions. The temporary sub-optimal hardware forwarding path is removed after all old application are terminated.

18 Claims, 10 Drawing Sheets

METHOD OF IPV6 AT DATA CENTER NETWORK WITH VM MOBILITY USING GRACEFUL ADDRESS MIGRATION

BACKGROUND

For network flexibility, a virtual machine may move from one server to another server on the same VLAN. However, virtual machine mobility may create a challenge. If the two servers are connected to different switch devices, packets from the other switch devices cannot be forwarded to the new egress switch device directly because at the ingress switch devices, the switch device prefix for the moved virtual machine may still point to the original egress switch device. As such, there exists a need for maintaining sub-optimal forwarding to the moved virtual machine temporarily and convert it to optimal forward with graceful address migration.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
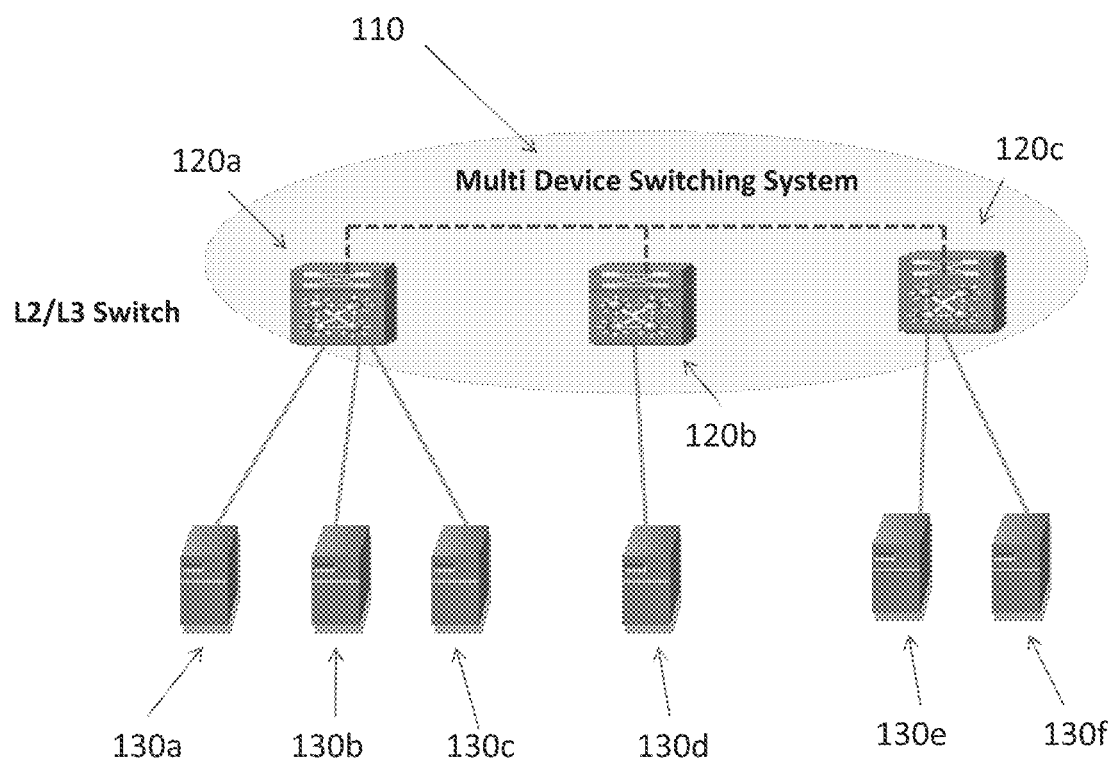
FIG. 1 illustrates an example network environment for embodiments of this disclosure.

Consistent with embodiments of the present disclosure, systems and methods are disclosed for graceful address migration upon the move of a virtual machine.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

As the virtual machine ("VM") concept is introduced into campus and data center networks, the number of hosts connected by switching systems at the data center grows dramatically, even in the order of millions. Traditional three-tier network architectures can no longer meet the requirements of these types of networks as more and more switches and routers must be added as the number of VMs grow. Latency, complexity, and cost may increase as well.

FIG. 1 illustrates an example network environment for embodiments of this disclosure. Example networks may be designed with a flattened architecture that consists of a multi device switching system 110. Multi device switching system 110 may comprise a plurality of L2/L3 switching devices 120a-c. Switching devices 120a-c may each be connected to a number of servers 130a-f.

In some embodiments, switching devices 120a-c may be directly linked together or (full-mess or cascade architecture) or through a switching fabric device (hub-spoke architecture) to form a virtual switch. All these switching devices may be controlled by a central controller. Routing protocols may run on the central controller as a single routing entity. All traffic may travel through the system as if switching through a single switching device. In such a switching system, a packet forwarded across switching devices 120a-c may go through two stages of hardware lookup and forwarding, once at an ingress switching device and once at an egress switching device.

IPv6 Protocol is designed to support a much greater number of addressable nodes and more capability of addressing hierarchy with a larger address size (128 bits). With the larger IPv6 address space, there is more flexibility for assigning network prefixes and addresses. This creates the possibility for aggregation.

Figure 2:
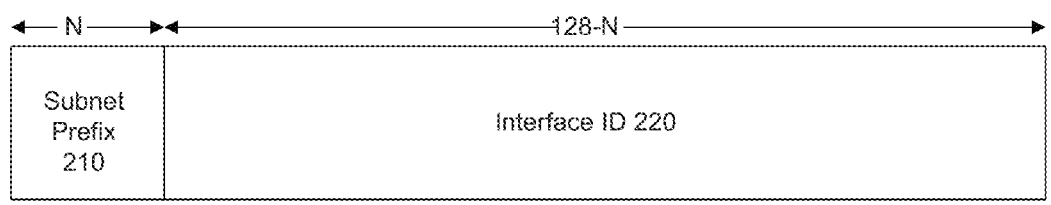
FIG. 2 illustrates the IPv6 address format.

FIG. 2 illustrates the IPv6 address format. The higher N bits may be used to store the subnet prefix 210. Subnet prefix 210 may be the subnet prefix assigned to the L3 interface. The remaining 128-N bits may be used to store the interface ID 220. Interface ID 220 may be used to identify the host connected to the L3 interface.

As described below in conjunction with FIGS. 3-6, IPv6 may be scaled on a Multiple Device Virtual Switching System. By applying the described techniques, the device prefix may be provisioned on an egress device and subsequently installed in the hardware of one or more ingress devices. Over a million virtual machines may be supported with limited FIB CAM size, such as 16k FIB entries. Packets may be switched from server to server in one switching hop, directly from an ingress switch device to an egress switch device. This may allow optimum switching performance.

However, virtual machine mobility creates a challenge for the described embodiments. For network flexibility, a virtual machine may move from one server to another server on the same VLAN. If the two servers are connected to different switch devices, packets from the other switch devices cannot be forwarded to the new egress switch device directly because at the ingress switch devices, the switch device prefix for the moved virtual machine may still point to the original egress switch device. Embodiments of the present disclosure as illustrated in conjunction with FIGS. 7-9 disclose methods for solving this problem by maintaining sub-optimal forwarding to the moved virtual machine temporarily and convert it to optimal forward with graceful address migration.

Figure 3:
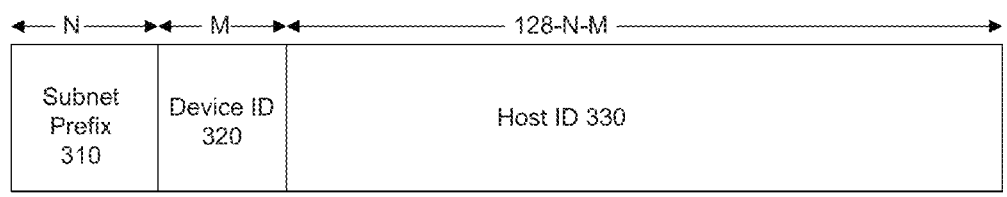
FIG. 3 illustrates an IPv6 address format according to embodiments of this disclosure.

FIG. 3 illustrates an IPv6 address format according to embodiments of this disclosure. The highest N bits may be used to store the subnet prefix 310. The next M bits may be allocated for a device ID 320. The device ID 320 may identify an individual device on the system. The remaining 128-N-M bits may be used to store the host ID 330. A device prefix may be formed by combining the subnet prefix and the device ID.

Embodiments described herein may be based on the configuration that a L3 virtual interface consists of multiple L2 switch ports. Furthermore, each of the multiple L2 switch ports may share the same VLAN ID. An L2 switch port associated with a switching device may be connected to multiple hosts or VMs. The device prefix may be provisioned on a switching device.

All device prefixes associated with a VLAN interface should be summarized by the subnet prefix on the VLAN interface. All assigned host addresses associated with the switching device should be summarized by the device prefix configured on the switching device. In some embodiments, subnet prefixes, device prefixes, and host addresses may be assigned through a DHCP server and other network management tools.

In operating environment according to embodiments described herein, a plurality of L2 ports associated with switching devices may reside on the same VLAN. An L3 virtual interface may be configured as described above. The L2 ports may be spread across multiple switching devices. In this setting, prior systems could not employ subnet prefix aggregation as the multiple destination switching devices may be associated with the same subnet prefix.

Embodiments described herein may install a device prefix in FIB CAM tables on all switching devices except for the local switching device. A destination device ID may be installed as the destination index for the device prefix. These device prefix FIB CAM entries may be used for ingress lookup. On the egress switching device, only local neighbor entries may be installed in the FIB CAM table on the local switching device. Neighbor FIB CAM entries may be employed for egress lookup. If both the source and destination are on the same switching device, neighbor FIB CAM entries may be used for FIB lookup as only one FIB lookup is required. Subnet prefixes may be installed on a local switching device, where the local switching device is configured to punt the entry neighbor discovery packet to the central controller CPU for processing.

Figure 4:
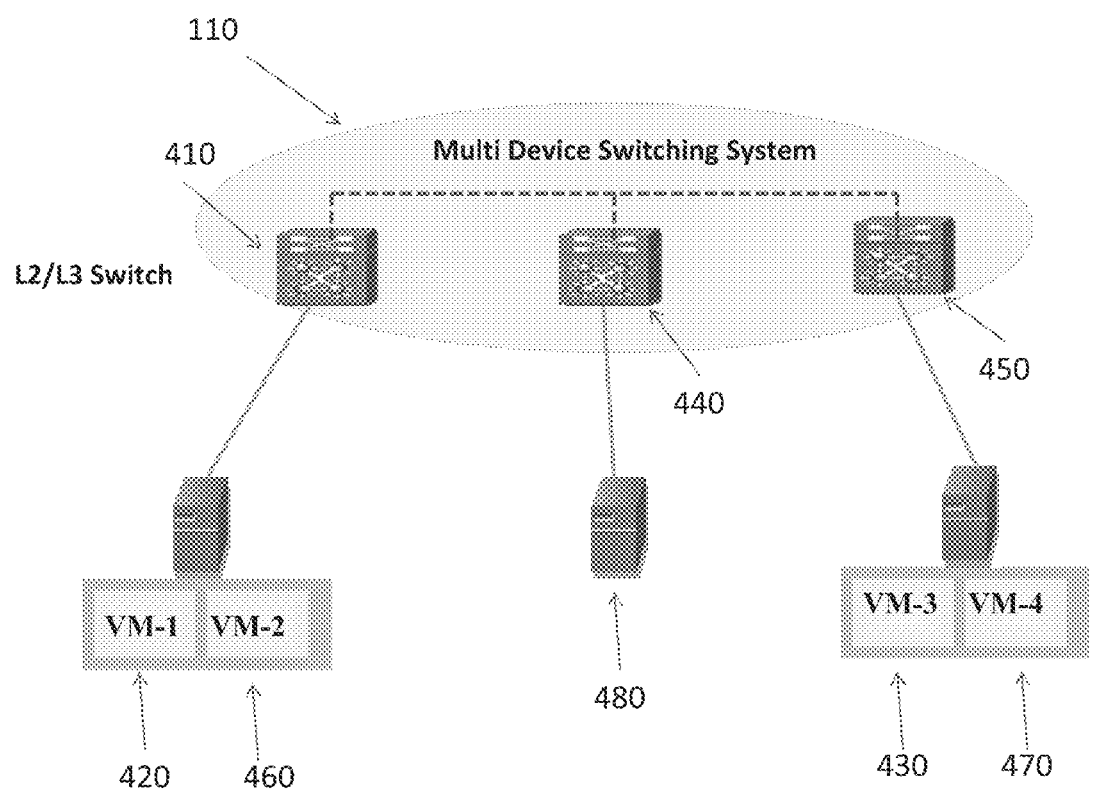
FIG. 4 illustrates example embodiments of the present disclosure.

FIG. 4 illustrates example embodiments of the present disclosure. Device prefix DP1 may be configured on a port associated with a switching device 450 connecting to VM 430 and VM 470. Device prefix DP1 may be installed in FIB CAM on switching device 410 and switching device 440. If an IPv6 packet comes from VM 420 with a destination of VM 430, it may arrive at switching device 410. The L3 ingress lookup may hit Device prefix DP1 with a destination index pointing to switching device 450.

Without L2 rewrite, the frame is forwarded to egress at switching device 450. At this stage, the MAC of the destination has been discovered by the system. A L3 egress lookup may then hit the destination CAM entry for VM 430. The packet will subsequently be forwarded to VM 430. Reverse traffic may be forwarded the same way with a device prefix provisioned on switch device 410 and installed in FIB CAM on switching device 450.

On a pure L3 interface without VLAN association, the subnet prefix configured on the interface with destination port index may be installed on all other associated switch devices. A packet arriving at an ingress switch device may hit the subnet prefix. The packet may then be forwarded to the egress switch device and reach its final destination.

On an Ether-channel (LAG) interface, the subnet prefix configured on the interface with Ether-channel destination index may be installed on all other associated switch devices. A packet arriving at an ingress switch device may hit the subnet prefix. The packet may then be forwarded to a switch device depending upon an Ether-channel load balancing algorithm. The packet may then be forwarded by the egress switch device based on egress lookup.

The maximum number of hosts that may be supported by embodiments of this disclosure employing the device prefix may be calculated via formula [1]

$$H=(F-V \times S) \times S \qquad [1]$$

H represents the maximum number of hosts supported. F represents the size of the FIB. V represents the number of VLANs per switching device. S represents the number of switch devices being employed. For example, with a FIB CAM size of 16,000 IPv6 entries, 100 switch devices, 1 VLAN per device, 1.6 million hosts may be supported. Similarly, with a FIB CAM size of 16,000, 100 switch devices, 50 VLANs per device, 1.1 million hosts may be supported.

Figure 5:
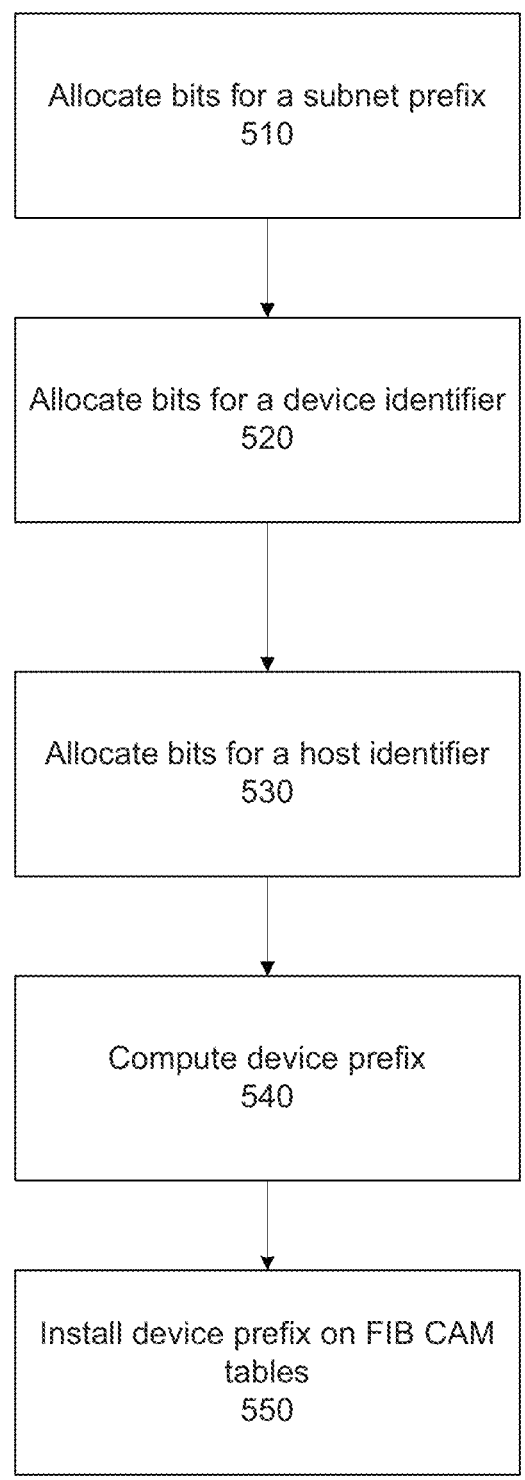
FIG. 5 is a flow chart illustrating embodiments of this disclosure.

FIG. 5 is a flow chart illustrating embodiments of this disclosure. Method 500 may begin at step 510 where a first quantity of bits in an IPv6 address may be allocated for storing a subnet prefix. Method 500 may then proceed to step 520, where a second quantity of bits in the IPv6 address may be allocated for storing a device identifier.

Method 500 may then proceed to step 530. At step 530, the remaining bits in the IPv6 address may be allocated for storing a host identifier. In some embodiments, the IPv6 address is appended to a packet transmitted across a Level-3 virtual interface comprised of a plurality of Layer-2 switch ports. Method 500 may then proceed to step 540 where a device prefix may be computed by combining the subnet prefix and the device identifier.

In some embodiments, two or more of the plurality of switching devices may share the same VLAN identification. Furthermore, at least one of the switching devices may be connected to one or more virtual machines. Method 500 may then proceed to step 550 where the device prefix may be installed in FIB CAM tables on a plurality of the switching devices. In some embodiments, all assigned host addresses associated with the device may be summarized by the device prefix.

Figure 6:
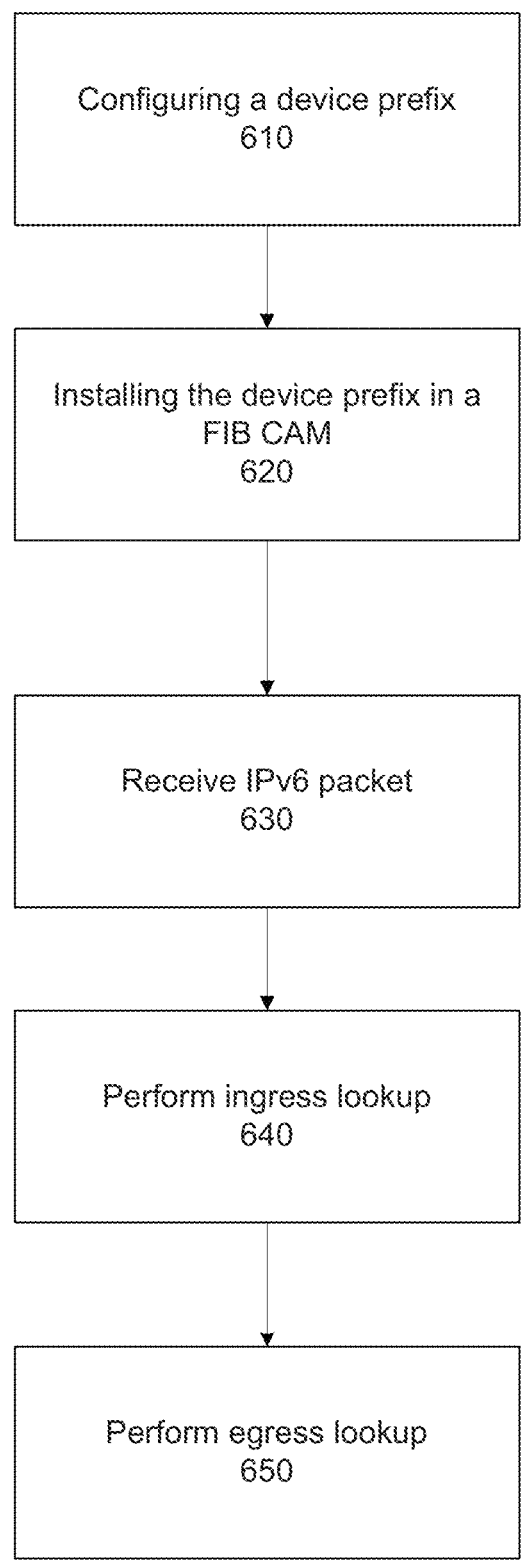
FIG. 6 is a flow chart illustrating embodiments of this disclosure.

FIG. 6 is a flow chart illustrating embodiments of this disclosure. Method 600 may begin at step 610, where one of a device prefix is configured. The prefix is determined based on IPv6 address information as described above in regards to FIG. 3. In some embodiments, the configuration may take place on a switching device. The switching device may reside on a path between the first virtual machine and the second virtual machine.

Method 600 may then proceed to step 620. At step 620, the prefix may be installed in a FIB CAM at the ingress switching device. In some embodiments, the prefix may comprise a destination index pointing to an egress switch device. Method 600 may then proceed to step 630, where an IPv6 packet may be received from a first virtual machine addressed to a second virtual machine.

Subsequent to the receipt of the IPv6 packet, method 600 may proceed to step 640. At step 640, an ingress lookup in hardware may be performed. The ingress lookup may locate the designated prefix. In some embodiments, method 600 may proceed to step 650, where an egress lookup in hardware may be performed as the packet traverses to its destination. The egress lookup may locate a destination entry on the FIB CAM corresponding to the second virtual machine. In some embodiments, the packet may be forwarded to the egress switch device based on the results of a load balancing algorithm. In some embodiments, method 600 may be performed on an L3 interface without VLAN association.

An embodiment consistent with this disclosure may comprise an apparatus for scaling IPv6 on multiple devices. The system may comprise a processor coupled to a memory, wherein the processor is operative to determine a device prefix value based on IPv6 address information. The processor may be further configured to install the device prefix value in FIB CAM tables associated with a plurality of connected switching devices.

The processor may further be configured to use the device prefix value for ingress lookup. In some embodiments, the apparatus may be a switching device. The switching device may reside on the same VLAN as the plurality of connected switching devices. The processor may be further configured to punt an entry data packet to a central controller for processing.

As discussed above, the embodiments discussed in conjunction with FIGS. 3-6 may experience problems associated when a virtual machine on a server connected to a switch device moves to another server connected to a different switch device. In this case, the hardware forwarding path to the moved virtual machine may be broken as packets destined to the moved virtual machine may still be sent to the original egress switch device.

When a virtual machine moves, to keep existing application sessions alive, the virtual machine may use the same IP and MAC addresses after movement. Similarly, the virtual machine may be required to stay on the same VLAN. Furthermore, the virtual machine may sends a neighbor discovery NA ("Neighbor Advertisement") packet to all nodes through a multicast IP address on the VLAN to notify the nodes on the VLAN that this virtual machine has moved. If the virtual machine is moved across a switch device boundary, the virtual machine movement can be detected on the new switching device by comparing the Device ID in the Source Address of the ND-NA with Device ID of the new switching device.

The neighbor discovery NA packet sent after virtual machine movement also may trigger a MAC relearning in a Layer-2 network within the virtual switching system. After the relearning, the MAC entry in MAC table on the original switching device may be updated to point to the new switching device. When a packet destined to the moved virtual machine arrives at the original (or home) switching device, an L3 lookup in hardware may hit the FIB entry for the virtual machine and the egress port is pointing to the new egress switching device.

Next, the packet may be forwarded to the new switching device. At the new switching device, a layer-2 lookup may match the MAC entry. If so, the packet may be bridged to the destination virtual machine. In some embodiments, traffic stats on the FIB may be used to reset the timer to prevent the FIB entry on the original switching device from being prematurely aged out.

The procedures described above establish a temporary two-hop hardware forwarding path for packets to reach the moved virtual machine (one hop from a source switching device to the original destination switching device and the second hop from the original destination switching device to the new destination switching device). One advantage of embodiments of this disclosure is that no additional FIB entry is required to establish the forwarding path.

For traffic in reversed direction, packets sent from the moved virtual machine on the new server to its peer on the other side of the connection may go directly to the remote switching device because on the new switching device, an L3 lookup may match the switching device prefix of the remote switching device.

In some embodiments of the present disclosure, a new IP address may be assigned to the virtual machine after its movement. This may result in more optimal hardware forwarding. The new IP address may include the switching device prefix of the new switching device on the VLAN. The new address can be either pushed from a DHCP server or requested from the virtual machine.

When a new address assignment occurs on the DHCP server, a DNS update message may be sent from the DHCP server to a DNS server. The update message may result in modifying a DNS AAAA ("IPv6") record to associate the virtual machine host-name with the new virtual machine IP address. After the DNS update, the DHCP server may 1) modify a preferred lifetime value to 0 for the old IP address; 2) modify a valid lifetime value to an amount greater than 0 for the old IP address; and 3) send a DHCP update to the virtual machine.

The updated AAAA record may be propagated to all DNS servers in the datacenter network. From that point, all new connections may use the new IP address and all existing connections may continue to use the old IP address.

Packets destined to the new IP address are optimally forwarded in hardware (with one hop) from any other switching devices to the new destination switch device, while packets destined to the old IP address are still forwarded to the original destination switching device and then bridged to the new destination switching device. After all old connections terminate, the old IP address may be purged by any number of normal aging mechanisms. Thereby, the process of converting from sub-optimal hardware forwarding to optimal hardware forwarding is completed.

In embodiments of the present disclosure, the above-described process may be repeated if the virtual machine moves again. There is no exceptional handing required for multiple virtual machine movements. Multiple IPv6 addresses and Graceful IPv6 address migration is well defined in RFC 4862 and RFC 3484 and should be supported by embodiments of the present disclosure.

Figure 7:
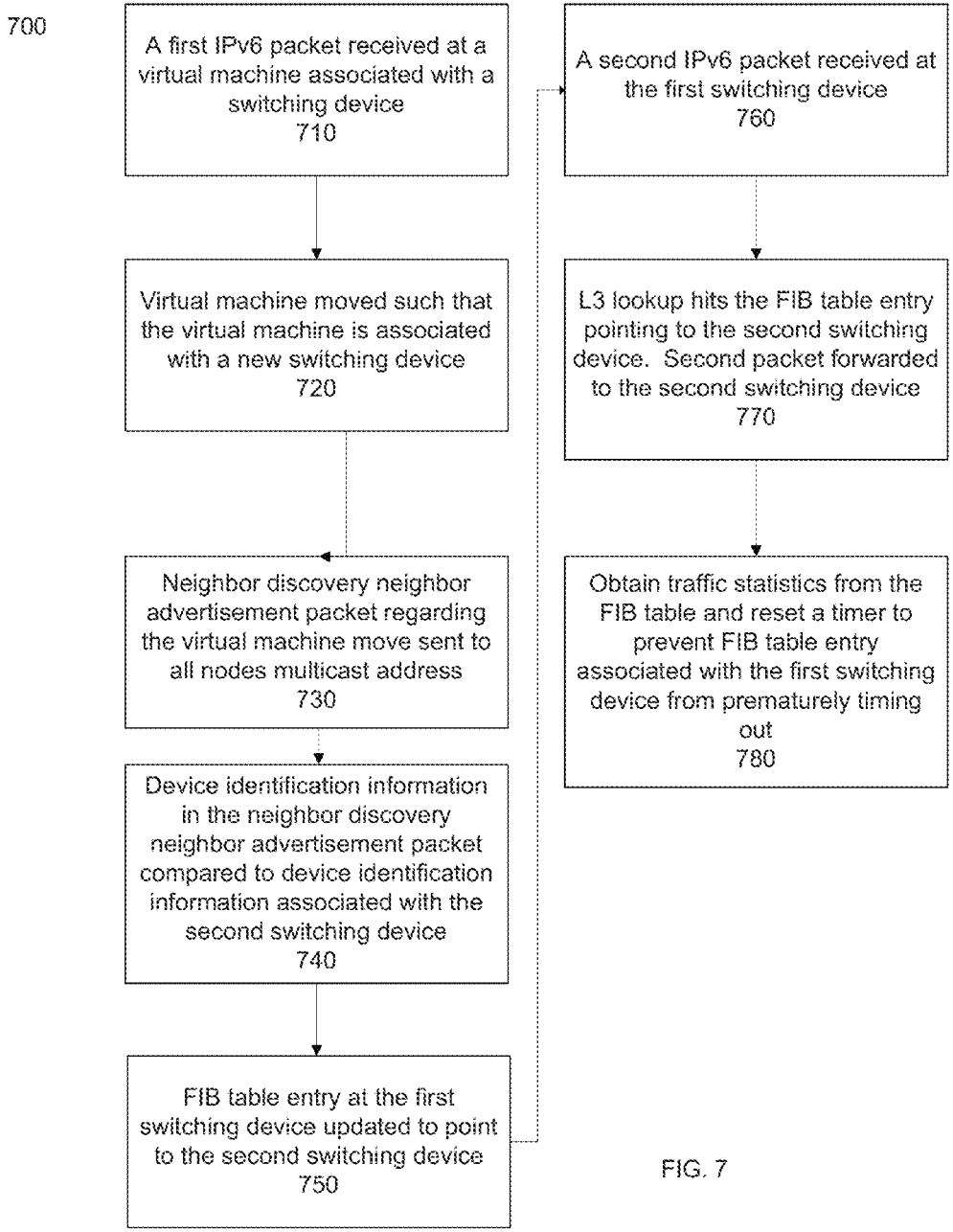
FIG. 7 is a flow chart illustrating embodiments of this disclosure.

FIG. 7 is a flow chart illustrating embodiments of the present disclosure. Method 700 may begin at step 710 where a first IPv6 packet may be received at a virtual machine associated with a switching device. The virtual machine may have been associated with the switching device for a period of time to facilitate the flow of IPv6 traffic.

Method 700 may then proceed to step 720. At step 720, the virtual machine may be moved such that the virtual machine is associated with a new switching device. Subsequently, at step 730, a neighbor discovery neighbor advertisement packet regarding the virtual machine move may be sent to all nodes multicast address. In some embodiments of the present disclosure, the neighbor discovery neighbor advertisement packet triggers a MAC address relearning process.

Subsequently, at step 740, device identification information in the neighbor discovery neighbor advertisement packet may be compared to device identification information associated with the second switching device. This may serve to confirm the move of the virtual machine if the device identification information in the neighbor discovery neighbor advertisement packet and the device identification information associated with the second switching device do not match.

At step 750, the FIB table entry at the first switching device may be updated to point to the second switching device Once the table entry has been updated, method 700 may proceed to step 760 where a second IPv6 packet may be received at the first switching device. The second IPv6 packet may be destined for the virtual machine. Method 700 may then progress to step 770.

Next, at step 770, L3 hardware lookup may hit the FIB entry that contains destination index points to the second switching device. Subsequently, the packet is forwarded to the destination switching device and reaches destination virtual machine.

Finally, at step 780, method 700 may obtain traffic statistics from the FIB table and reset a timer to prevent FIB table entries associated with the first switching device from prematurely timing out.

Figure 8:
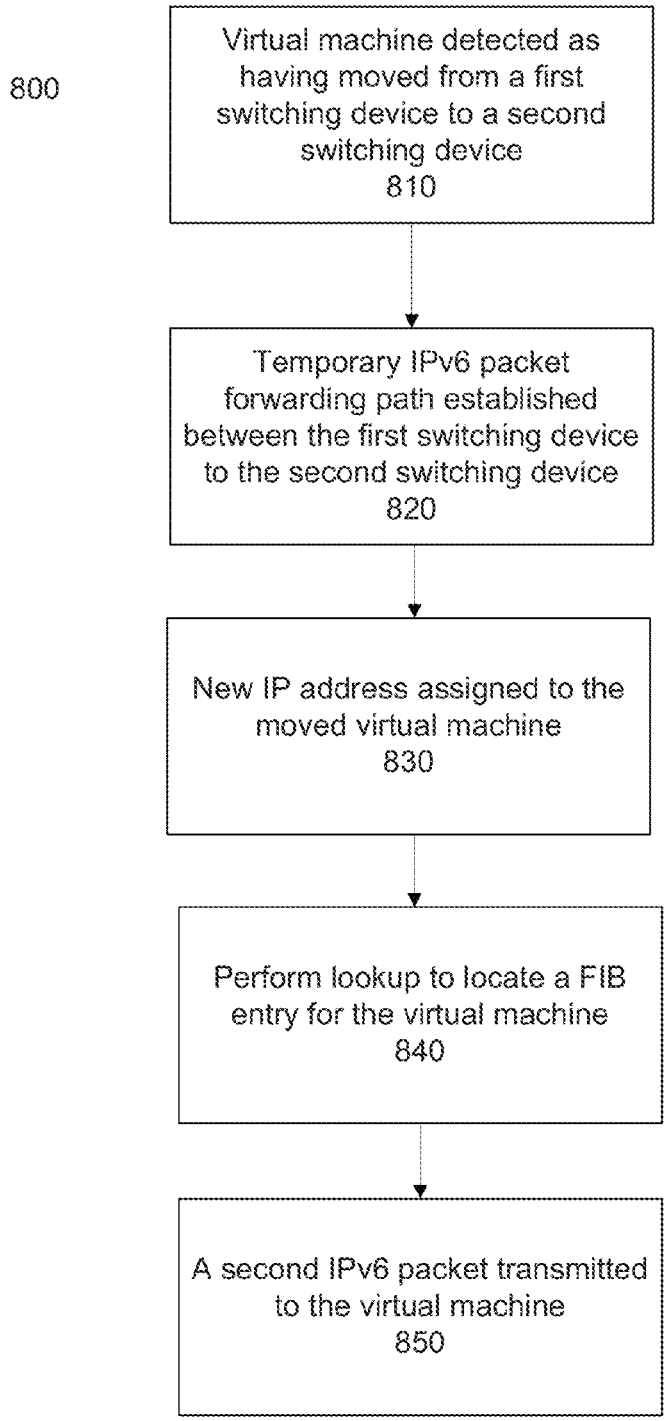
FIG. 8 is a flow chart illustrating embodiments of this disclosure.

FIG. 8 is a flow chart illustrating embodiments of the present disclosure. Method 800 may begin at step 810 where a virtual machine may be detected as having moved from a first switching device to a second switching device. After a virtual machine move has been detected, method 800 may proceed to step 820. At step 820, a temporary IPv6 packet forwarding path may be established from the first switching device to the second switching device. In some embodiments, the switching devices reside on the same VLAN.

Method 800 may next proceed to step 830. At step 830, a new IP address may be assigned to the moved virtual machine. Next, at step 840 a lookup to locate a FIB entry for the virtual machine may be performed on the first switching device. In some embodiments, the new IP address may be pushed from a DHCP server. Finally, at step 850, the received IPv6 packet may be transmitted to the destination virtual machine.

Figure 9:
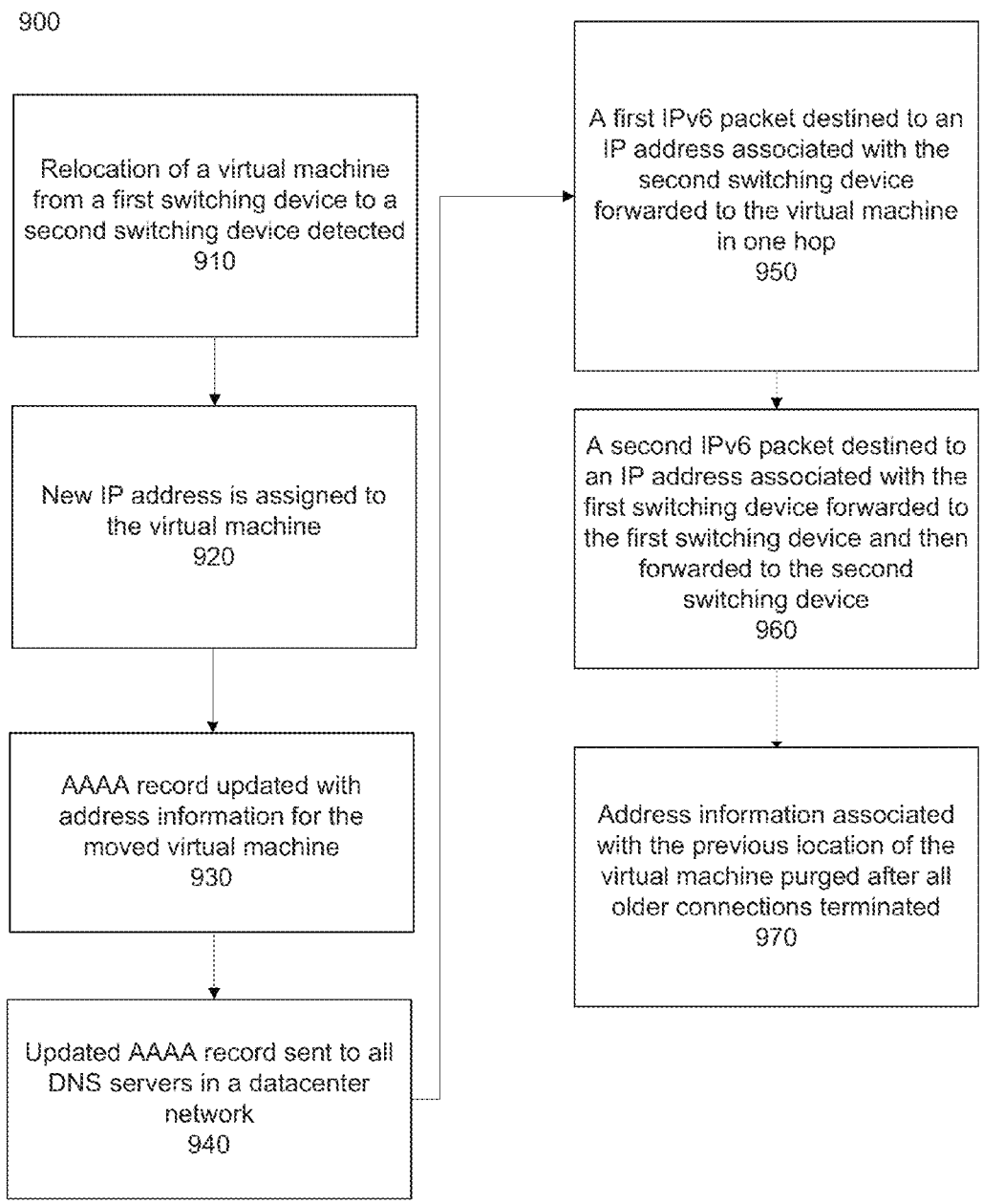
FIG. 9 is a flow chart illustrating embodiments of this disclosure.

FIG. 9 is a flow chart illustrating embodiments of the present disclosure. Method 900 may start at step 910 where a relocation of a virtual machine from a first switching device to a second switching device may be detected. Subsequently, at step 920, a new IP address is assigned to the moved virtual machine.

After the move has been detected and new IP address is assigned method 900 may proceed to step 930. At step 930, an AAAA record may be updated with address information for the moved virtual machine. The new AAAA record reflects the updated location of the virtual machine. Next, at step 940, the updated AAAA record may be sent to all DNS servers in a datacenter network.

Method 900 may then proceed to step 950 where a first IPv6 packet destined to an IP address associated with the second switching device may be forwarded to the virtual machine in one hop. At step 960 a second IPv6 packet destined to the old IP address associated with the first switching device may be forwarded to the first switching device and the be forwarded to the second switching device. The second IPv6 packet may then be forwarded to the destination virtual machine from the second switching device. In some embodiments, the new IP address may be requested directly from the moved virtual machine.

Method 900 may then advance to step 970. At step 970, the address information associated with the previous location of the virtual machine may be purged after all older connections terminate. It should be understood that the process can be repeated any number of times as the virtual machine is moved from one location to the next.

Figure 10:
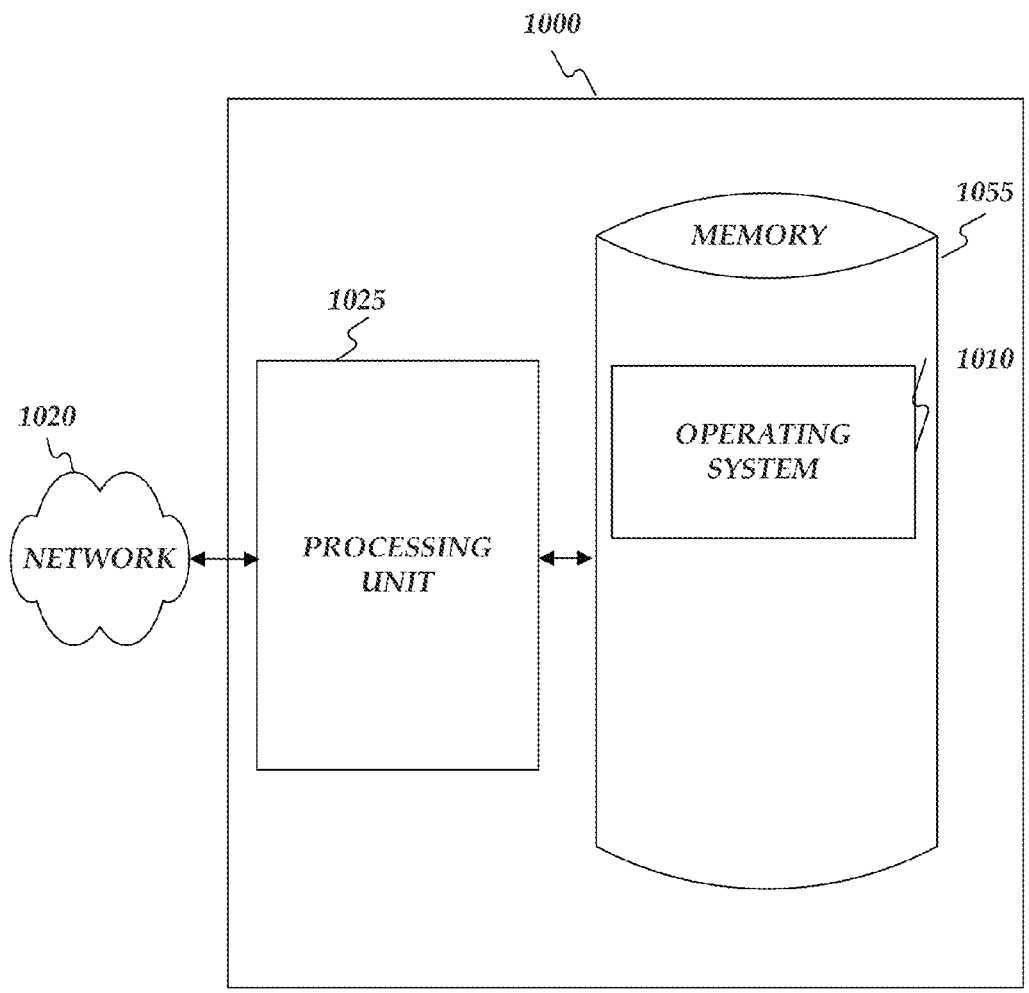
FIG. 10 is a block diagram of a computing network device.

FIG. 10 illustrates a computing device 1000. Computing device 1000 may include processing unit 1025 and memory 1055. Memory 1055 may include software configured to execute application modules such as an operating system 1010. Computing device 1000 may execute, for example, one or more stages included in the methods as described above. Moreover, any one or more of the stages included in the above describe methods may be performed on any element shown in FIG. 10.

Computing device 1000 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:
1. A method comprising:
 receiving a first IPv6 packet at a virtual machine associated with a first switching device;

moving the virtual machine such that the virtual machine is associated with a second switching device;
detecting the virtual machine movement;
updating L2 and L3 hardware table entries on the first switching machine with address information associated with the moved virtual machine;
assigning a new IP address to the virtual machine after relocation;
updating an AAAA record with address information for the second switching device at a first DNS server;
sending the updated AAAA record to all DNS servers other than the first DNS server in a datacenter network;
wherein the updated AAAA record indicates the new location of the virtual machine;
receiving a second IPv6 packet at the first switching device destined for the virtual machine;
obtaining updated virtual machine address information from the L2 and L3 hardware table entries;
establishing a temporary IPv6 packet hardware forwarding path from the first switching device to the second switching device in response to detecting the virtual machine movement; and
redirecting the second packet to the second switching device on the forwarding path.

2. The method of claim 1, wherein the address information includes a MAC address and an IP address.

3. The method of claim 1, further comprising:
sending a neighbor discovery neighbor advertisement packet regarding the virtual machine move to all nodes multicast address.

4. The method of claim 3, further comprising:
comparing device identification information in the neighbor discovery neighbor advertisement packet to device identification information associated with the second switching device; and
confirming the move of the virtual machine if the device identification information in the neighbor discovery neighbor advertisement packet and the device identification information associated with the second switching device do not match.

5. The method of claim 3, wherein the neighbor discovery neighbor advertisement packet triggers a MAC address relearning process in hardware.

6. The method of claim 3, further comprising:
updating a hardware FIB table entry at the first switching device to point to the second switching device.

7. The method of claim 6 further comprising:
forwarding the packet from the first switching device to the destination switching device in hardware.

8. The method of claim 6, further comprising:
obtaining traffic statistics from the hardware FIB table; and
resetting a timer to prevent FIB table entries associated with the first switching device from prematurely timing out.

9. An apparatus comprising:
a memory; and
a processor coupled to the memory, wherein the processor is operative to:
detect a virtual machine moving from a first switching device to a second switching device;
update L2 and L3 hardware table entries on the first switching device with address information associated with the moved virtual machine;
assigning a new IP address to the virtual machine after relocation;
update an AAAA record with address information for the second switching device at a first DNS server;
send the updated AAAA record to all DNS servers other than the first DNS server in a datacenter network;
wherein the updated AAAA record indicates the new location of the virtual machine; and
establish a temporary IPv6 packet hardware forwarding path from the first switching device to the second switching device in response to detecting the virtual machine movement;
receiving a IPv6 packet at the first switching device destined for the virtual machine;
obtaining updated virtual machine address information from the L2 and L3 hardware table entries;
redirecting the IPv6 packet from the first switching device to the second switching device on the forwarding path.

10. The apparatus of claim 9, wherein the plurality of connected switching devices reside on the same VLAN.

11. The apparatus of claim 10, wherein the processor is further operative to:
perform a lookup in hardware to locate the new FIB entry for the virtual machine; and
rewrite a header of a received IPv6 packet with the MAC address indicated in the hardware FIB entry.

12. The apparatus of claim 11, wherein the processor is further operative to: transmit the received IPv6 packet in hardware to the virtual machine.

13. The apparatus of claim 12, wherein the new IP address is pushed from a DHCP server.

14. A method comprising:
detecting a relocation of a virtual machine from a first switching device to a second switching device;
updating L2 and L3 hardware table entries on the first switching device with address information associated with the moved virtual machine;
assigning a new IP address to the virtual machine after relocation;
updating an AAAA record with address information for the second switching device at a first DNS server;
sending the updated AAAA record to all DNS servers other than the first DNS server in a datacenter network;
wherein the updated AAAA record indicates the new location of the virtual machine;
establishing a temporary IPv6 packet hardware forwarding path from the first switching device to the second switching device in response to detecting the virtual machine movement;
forwarding a first IPv6 packet destined to an IP address associated with the second switching device to the virtual machine in one hop in hardware;
forwarding a second IPv6 packet destined to an IP address associated with the first switching device to the first switching device in hardware; and
forwarding the second IPv6 packet to the virtual machine from the first switching device through the second switching device in hardware using the forwarding path.

15. The method of claim 14, further comprising:
purging the address information associated with the previous location of the virtual machine after all older connections terminate.

16. The method of claim 14, further comprising:
requesting the new IP address directly from the moved virtual machine.

17. The method of claim 16, further comprising:
detecting a second relocation of a virtual machine from the second switching device to a third switching device;
updating an AAAA record with address information for the third switching device; and sending the updated AAAA record to all DNS servers in the datacenter network.

18. The method of claim 17, wherein address information includes a MAC address and an IP address.

\* \* \* \* \*